(12) United States Patent
Hao et al.

(10) Patent No.: US 11,995,104 B2
(45) Date of Patent: May 28, 2024

(54) LINEAR INTERVAL-BASED DYNAMIC RANGE PARTITIONING

(71) Applicant: SAP SE, Walldorf (DE)

(72) Inventors: Zhilong Hao, Xi'an (CN); Xiaoke Liu, Xi'an (CN); Jiaxin Liu, Xi'an (CN); Weimin Qi, Xi'an (CN); Zhe Qu, Xi'an (CN); Qingwei Ren, Xi'an (CN)

(73) Assignee: SAP SE, Walldorf (DE)

( * ) Notice: Subject to any disclaimer, the term of this patent is extended or adjusted under 35 U.S.C. 154(b) by 2 days.

(21) Appl. No.: 17/826,957

(22) Filed: May 27, 2022

(65) Prior Publication Data
US 2023/0409603 A1 Dec. 21, 2023

(51) Int. Cl.
*G06F 16/30* (2019.01)
*G06F 16/22* (2019.01)
*G06F 16/23* (2019.01)
*G06F 16/27* (2019.01)

(52) U.S. Cl.
CPC ........ *G06F 16/278* (2019.01); *G06F 16/2282* (2019.01); *G06F 16/2358* (2019.01)

(58) Field of Classification Search
None
See application file for complete search history.

(56) References Cited

U.S. PATENT DOCUMENTS

| | | | | |
|---|---|---|---|---|
| 6,275,898 B1* | 8/2001 | DeKoning | G06F 3/0605 | 711/114 |
| 9,026,765 B1* | 5/2015 | Marshak | G06F 3/061 | 711/170 |
| 9,740,762 B2* | 8/2017 | Horowitz | G06F 16/278 | |
| 11,308,066 B1* | 4/2022 | Li | G06F 16/278 | |
| 11,640,391 B2 | 5/2023 | Loaiza et al. | | |
| 11,741,127 B2* | 8/2023 | Liu | G06F 16/24542 | 707/715 |
| 2004/0141509 A1* | 7/2004 | Sahni | H04L 45/748 | 370/401 |
| 2004/0267782 A1* | 12/2004 | Nakano | G06F 16/2282 | |
| 2007/0143564 A1* | 6/2007 | Uppala | G06F 16/27 | 711/173 |
| 2007/0156769 A1* | 7/2007 | Sinclair | G06F 16/24554 | |
| 2009/0235043 A1* | 9/2009 | Jaiswal | G06F 16/24554 | 711/E12.001 |
| 2009/0260016 A1* | 10/2009 | Ramakrishnan | G06F 9/5083 | 718/105 |
| 2010/0030800 A1* | 2/2010 | Brodfuehrer | G06F 16/2282 | 707/E17.005 |

(Continued)

*Primary Examiner* — Polina G Peach
(74) *Attorney, Agent, or Firm* — Fountainhead Law Group P.C.

(57) ABSTRACT

Computer-readable media, methods, and systems are disclosed for linear interval-based dynamic range partitioning in one or more database systems. A request is received by a database management system to insert a new row into a partitioned database table. The partitioned database table may include a plurality of existing partitions and a partition others partition. Based on determining that the new row should be inserted into the partition others partition a series of steps are performed. First, one or more new partitions are added to the partitioned database table. Then, the new row is inserted into the one of the one or more new partitions in the partitioned database table.

18 Claims, 5 Drawing Sheets

(56) References Cited

U.S. PATENT DOCUMENTS

| | | | |
|---|---|---|---|
| 2014/0189281 A1* | 7/2014 | Sokol, Jr. | G06F 12/08 |
| | | | 711/171 |
| 2014/0279961 A1* | 9/2014 | Schreter | G06F 3/0673 |
| | | | 707/693 |
| 2014/0324881 A1* | 10/2014 | Ransil | G06F 11/1446 |
| | | | 707/741 |
| 2015/0106407 A1* | 4/2015 | Adayilamuriyil | G06F 16/2282 |
| | | | 707/804 |
| 2015/0261807 A1 | 9/2015 | Pathak et al. | |
| 2016/0350392 A1* | 12/2016 | Rice | G06F 16/27 |
| 2018/0300385 A1* | 10/2018 | Merriman | G06F 16/278 |
| 2019/0340260 A1* | 11/2019 | Eberlein | G06F 16/278 |
| 2020/0042399 A1* | 2/2020 | Kuang | G06F 11/1435 |
| 2021/0081453 A1* | 3/2021 | Eadon | G06F 16/278 |
| 2021/0200770 A1* | 7/2021 | Pandey | G06F 16/2477 |
| 2022/0215010 A1 | 7/2022 | Dash | |
| 2022/0264136 A1* | 8/2022 | Chen | H04N 19/157 |
| 2023/0129468 A1* | 4/2023 | Liu | G06F 16/24542 |
| | | | 707/715 |
| 2023/0385263 A1 | 11/2023 | Liu et al. | |

* cited by examiner

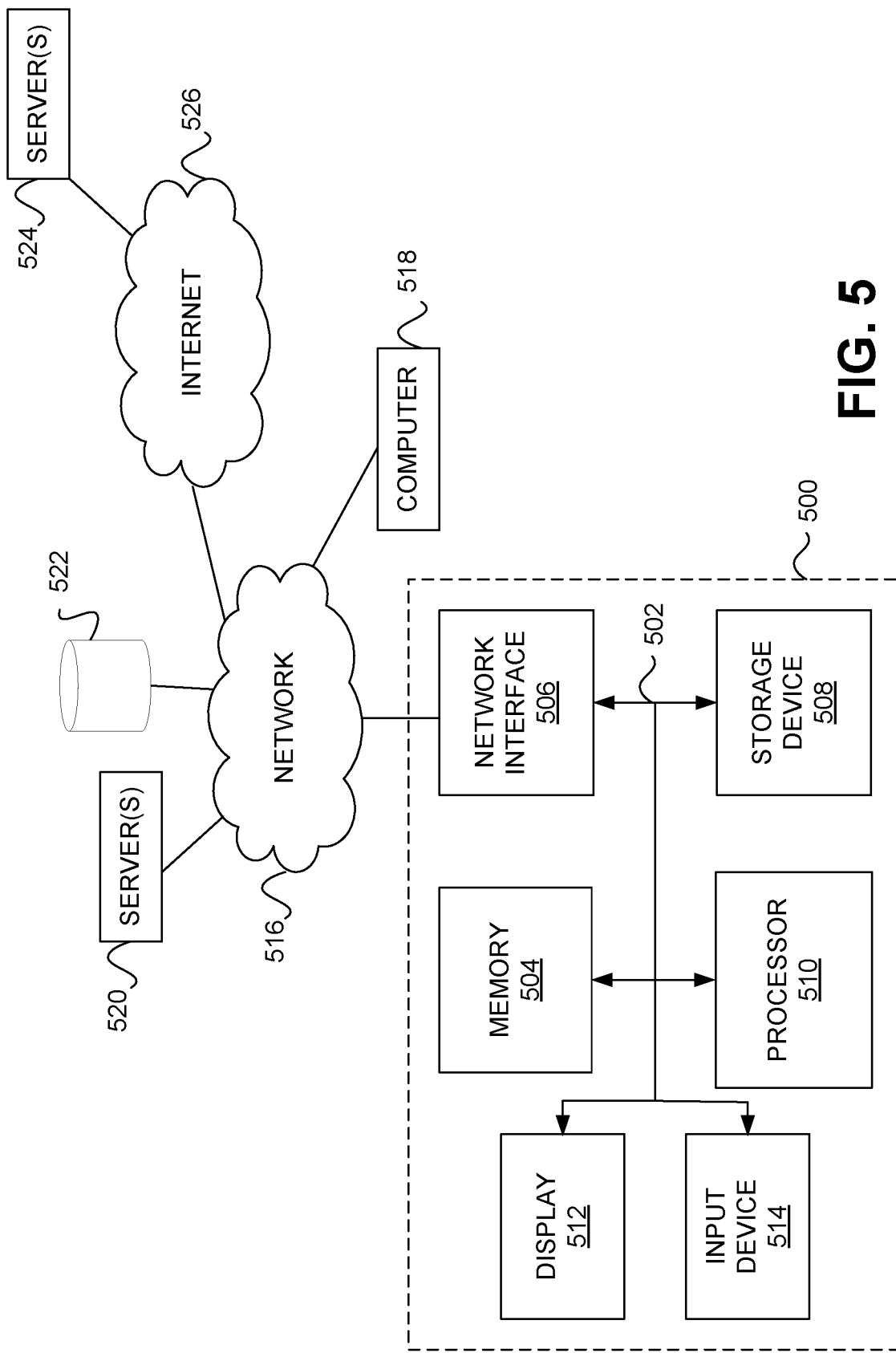

LINEAR INTERVAL-BASED DYNAMIC RANGE PARTITIONING

TECHNICAL FIELD

Embodiments generally relate to linear interval-based dynamic range partitioning in database management systems, and more particularly to dynamically adding partitions in a database management system according to a linear interval-based range partitioning mechanism.

In modern database systems, there is often a strong demand for storing a large amount of data in a single table, which is a common user requirement, and can help simplify database modeling. In existing database management systems, there are typically design limitations with respect to a maximum number of records that a single table can store. Accordingly, database administrators have a requirement to split their data into separate tables to overcome a corresponding limitation regarding a number of records that can be stored in a single table. Corresponding problems are encountered in response to a requirement to query data over multiple tables, i.e., by way of a relational database management system join. To provide greater record storage and an overall improved user experience, there is a need for mechanisms to overcome such limitations. One such mechanism involves the use of partitioned table. In some database management systems, a partitioned table consists of multiple internal database tables, each internal table serving as a logical partition. As such a partitioned table can hold many more records than a single conventional database table. In the context of partitioned tables, there are frameworks to control data distribution among partitions associated with a partitioned table, which are called partitioning types, e.g., partitioned by HASH, ROUNDROBIN, RANGE or composite types like HASH-RANGE, ROUNDROBIN-RANGE, RANGE-RANGE, etc. Range-partitioned tables must be initially created by a database administrator defining a certain number of range-based partitions and a catch-all "partition others" partition. However, as time goes on, the partition others partition becomes over-full and additional partitions need to be created and records moved around to new partitions. Manually creating new partitions with data definition language (DDL) commands is labor intensive for database administrators, and extremely computationally intensive for a database management system, potentially requiring scheduled maintenance windows for rebalancing partitions. Accordingly, what is needed is a method for linear interval-based dynamic range partitioning in database systems that do not require manual intervention, thereby addressing the above-mentioned problems.

SUMMARY

Disclosed embodiments address the above-mentioned problems by providing one or more non-transitory computer-readable media storing computer-executable instructions that, when executed by a processor, perform a method for linear interval-based dynamic range partitioning in one or more database systems, the method comprising: receiving, by a database management system, a request to insert a new row into a partitioned database table, wherein the partitioned database table comprises a plurality of existing partitions and a partition others partition, based on determining that the new row should be inserted into the partition others partition: adding one or more new partitions to the partitioned database table, and inserting the new row into the one of the one or more new partitions in the partitioned database table.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein:

FIG. 5 is a diagram illustrating a sample computing device architecture for implementing various aspects described herein.

Figure 1:
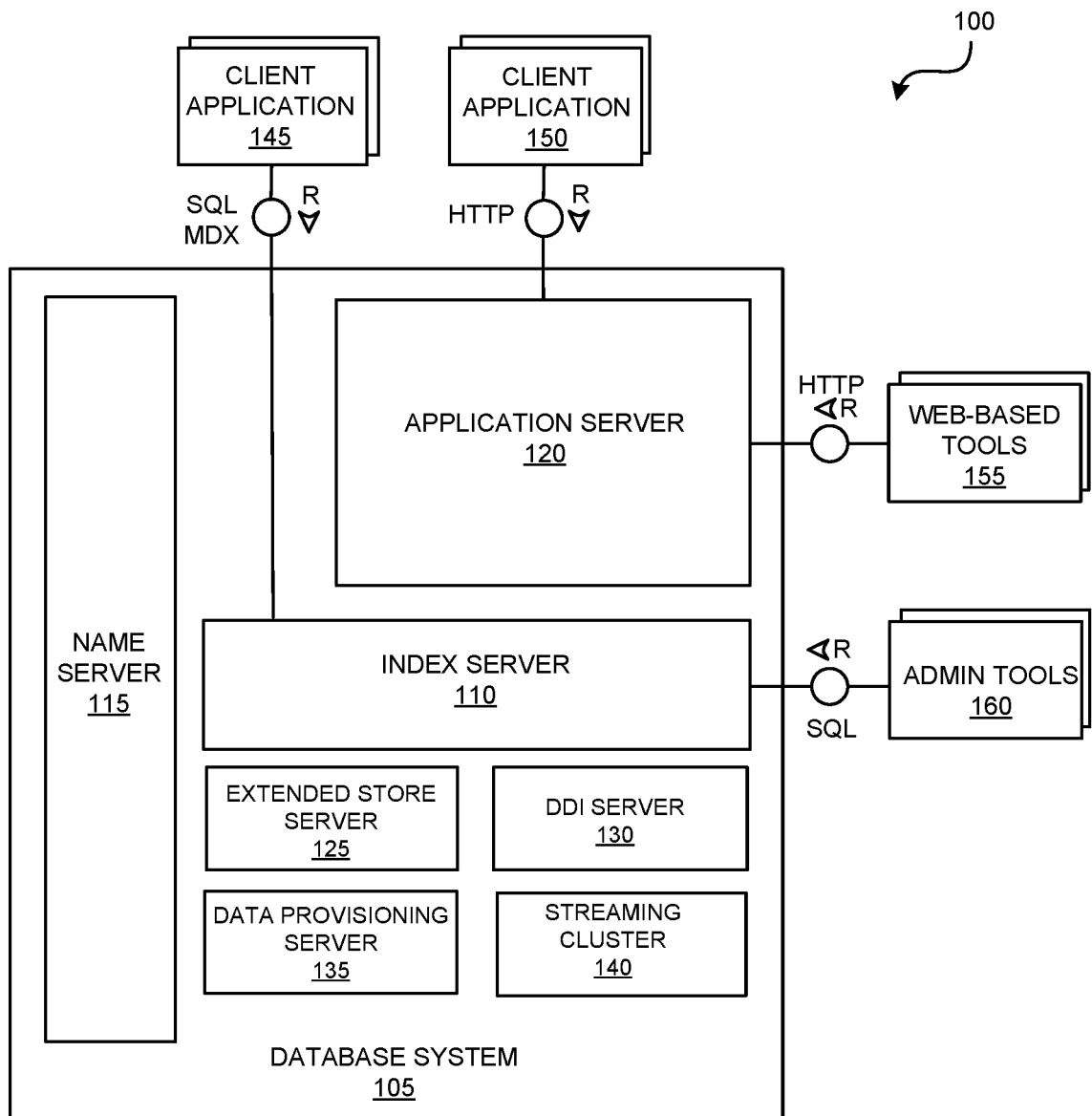
FIG. 1 is a system diagram illustrating an example database system for use in connection with the current subject matter.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

Range partitioning creates dedicated partitions for certain values or value ranges in a table. Usually, this requires an in-depth knowledge of the values that are used or valid for the chosen partitioning column. For example, a range partitioning scheme can be chosen to create one partition for each calendar month. Software applications using a partitioned database table may choose to use range partitioning to actively manage the partitioning of a partitioned table. That is, partitions may be created or dropped as needed. For example, an application may create a partition for an upcoming month so that new data is inserted into that new partition.

A range partitioning scheme usually takes ranges of values to determine a range of values that go into a particular partition, for example, values 1 to 10 or 1000 to 3000. It is also possible to define a partition for a single value. In this way, a list partitioning known in other database systems can be emulated and combined with range partitioning. When rows are inserted or modified, the target partition is determined by the ranges defined in the database schema. If a value does not fit into one of these ranges, an error may be raised. If this is not wanted, it is possible to define a partition others partition where all rows that do not match any of the defined ranges are inserted. Partition others partitions can be created or dropped on-the-fly as desired. Range partitioning is similar to hash partitioning in that the partitioning column must be part of the primary key. Uses of range partitioned tables may pre-define a partitioned table with different ranges of a column's value. For example, a table can be defined like this:

CREATE TABLE T1 (C1 INT, C2 INT) PARTI-
       TION BY RANGE (C1) (PARTITION
       0<=VALUES<1000, PARTITION 1000<=VAL-
       UES<3000)

Data set (of column C1) between 0 and 1000 are inserted into partition 1, data set (of column C1) between 1000 and 3000 are inserted into partition 2. Other data set insertions are all disallowed and/or result in an error condition. As noted, it is possible for a database administrator to create a special partition "partition others" for data not fitting any of the pre-defined partitions. Such a DDL statement may be expressed as follows.

CREATE TABLE T1 (C1 INT, C2 INT) PARTI-
       TION BY RANGE (C1) (PARTITION
       0<=VALUES<1000, PARTITION 1000<=VAL-
       UES<3000, PARTITION OTHERS)

As time goes on, and more records are stored, there still may be too many rows that need to be stored in the partition others partition, which leads to the original problem of not being able to store a sufficiently large number of rows in a conventional database table. Accordingly, database management systems consistent with the present teachings may provide a feature called linear interval-based dynamic range partitioning, which can automatically and continuously create new partitions based on a predetermined interval. In some embodiments, data from the partition others partition may be moved to the newly created partitions. In some embodiments, after re-distributing the existing rows from the partition others partition, the partition others partition may be emptied for future data insertions that do not fit into either the existing partitions or the new, dynamically created partitions. Such a dynamic range partitioning feature may be deployed in connection with a single-level range partitioning type, or even multi-level partitioning types for example HASH-RANGE, or RANGE-RANGE.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments

FIG. 1 is a system diagram 100 illustrating an example database system 105 for use in connection with the current subject matter. Database system 105 can, for example, be an in-memory database in which all relevant data is kept in main memory so that read operations can be executed without disk I/O and in which disk storage is required to make any changes durable by way of persistent storage. Database system 105 can include a plurality of servers including, for example, one or more of index server 110, name server 115, and/or application server 120. Database system 105 can also include one or more of extended store server 125, database deployment infrastructure (DDI) server 130, data provisioning server 135, and/or streaming cluster 140. Database system 105 can be accessed by a plurality of client applications 145, 150 via different protocols such as structured query language (SQL) and/or multidimensional expressions (MDX), by way of index server 110, and/or web-based protocols such as hyper-text transport protocol (HTTP), by way of application server 120.

Index server 110 may contain in-memory data stores and engines for processing data. Index server 110 may also be accessed by remote tools (via, for example, SQL queries), that can provide various development environment and administration tools. Additional details regarding an example implementation of index server 110 is described and illustrated in connection with FIG. 2 below.

In some embodiments, name server 115 is responsible for information about various topologies associated with database system 105. In various exemplary distributed database systems, name server 115 provides descriptions regarding where various components are running and which data is located on which server. In connection with database system 105 having multiple database containers, name server 115 may provide information regarding existing database containers. Name server 115 may also host one or more system databases. For example, name server 115 may manage the information regarding existing tenant databases, which tenant databases are isolated from one another. Unlike name server 115 in a single-container database system, name server 115 in a database system 105 having multiple database containers does not store topology information such as the location of tables in a distributed database. In a multi-container database system 105 such database-level topology information can be stored as part of data catalogs associated with the various isolated tenant databases.

Application server 120 can enable native web applications used by one or more client applications 150 accessing database system 105 via a web protocol such as HTTP. In various embodiments, application server 120 allows developers to write and run various database applications without the need to provide an additional application server. In some embodiments, application server 120 can also be used to run web-based tools 155 for administration, life-cycle management, and application development. Other administration and development tools 160 can directly access index server 110 for, example, via SQL and/or other protocols.

In various embodiments, extended store server 125 can be part of a dynamic tiering option that can include a high-performance disk-based column store for very big data up to the petabyte range and beyond. Less frequently accessed data (for which is it non-optimal to maintain in main memory of the index server 110) can be maintained in connection with extended store server 125. Dynamic tiering associated with extended store server 125 allows for hosting of very large databases with a reduced cost of ownership as compared to conventional arrangements.

In various embodiments, DDI server 130 may be a separate server process that is part of a database deployment infrastructure. This infrastructure may be a layer of database system 105 that simplifies deployment of database objects using declarative design time artifacts. DDI can ensure a consistent deployment, for example by guaranteeing that multiple objects are deployed in the right sequence based on dependencies, and by implementing a transactional all-or-nothing deployment.

In some embodiments, data provisioning server 135 provides enterprise information management and enables capabilities such as data provisioning in real time and batch mode, real-time data transformations, data quality functions, adapters for various types of remote sources, and an adapter software design kit (SDK) for developing additional adapters. In various embodiments, streaming cluster 140 allows for various types of data streams (i.e., data feeds, etc.) to be utilized by database system 105. Streaming cluster 140 allows for both consumption of data streams and for complex event processing.

Figure 2:
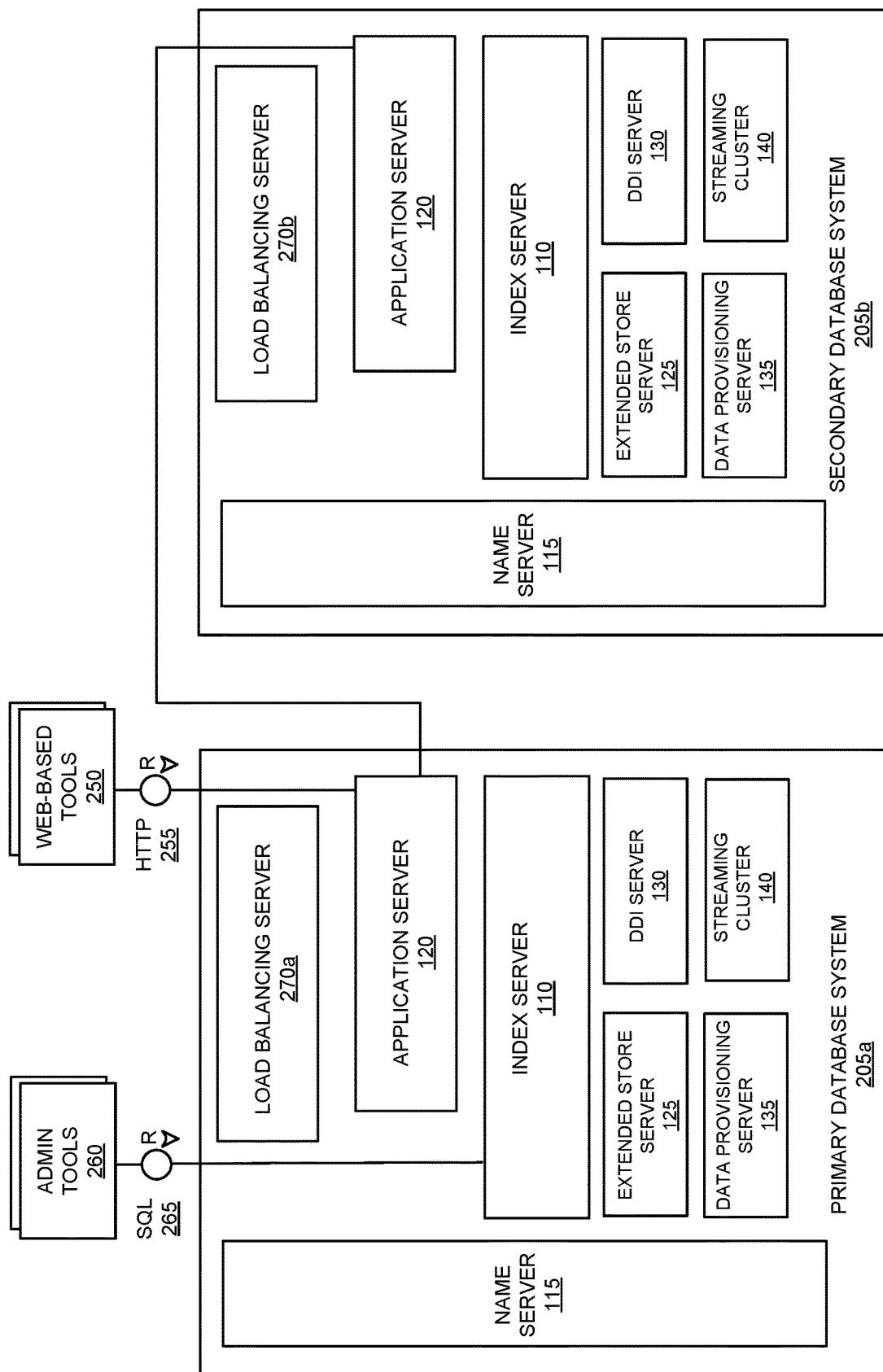
FIG. 2 is a system diagram illustrating an architecture to support load balancing between a primary database system and a secondary database system.

FIG. 2 is a system diagram illustrating an architecture 200 to support load balancing between a primary database system 205a and a secondary database system 205b consistent with the present teachings. Each of the primary system 205a and the secondary system 205b may be a single instance system, similar to database system 105 depicted in FIG. 1, or each may be a distributed variation of database system 105. Such an architecture may be useful in a high availability data system, or in a disaster recovery system, or in a combination high availability disaster recovery system.

Each of the primary system 205a and secondary system 205b may include a load balancing functionality. Such load balancing functionality may for example be contained within a distinct load balancing server 270a or 270b. But such load balancing functionality may be managed by any suitable processing system. For example, application server 120 of FIG. 1 may also manage the load balancing of requests issued to the application server of the primary system 205a, sending requests to the secondary system 205b as necessary to maintain a well-distributed workload.

As depicted in FIG. 2, each of the primary system 205a and the secondary system 205b includes load balancing server 270a and 270b which respectively receive requests from user applications directed to the primary system 205a or the secondary system 205b. Such request may come from either admin tools 260 or web-based tools 250, or any other user application. Upon receiving a request, a load balancing server, e.g., load balancing server 270a, determines how to distribute associated workload. As depicted, load balancing server 270a routes an SQL request 265 from admin tools 260 to index server 110 of primary system 205a, while routing an HTTP request 255 from web-based tools 250 to application server 120 of secondary system 205b.

Load balancing of resources between primary system 205a and secondary system 205b may give rise to several complicating issues. For example, if either of requests 255, 265 requires writing to one or more data tables, or modifying a data table, then the two systems 205a, 205b may diverge. After many instances of write requests being distributed between primary system 205a and secondary system 205b, the two systems would be substantially inconsistent, and likely unsuitable as replacements for each other. In another example, an application request, e.g., 265, may perform a write transaction that is followed by a read transaction, e.g., 255, related to the data written by the write request 265. If the write request is allocated to the primary system 205a, the read request would obtain a different result depending on whether the subsequent read transaction is carried out by the primary system 205a or by the secondary system 205b.

Load balancing in a combination high availability disaster recovery system, by distributing a portion of the workload of a primary data system to a hot-standby or backup system should be carried out in a manner that would not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system should maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications. In some embodiments, snapshots may be employed to facilitate database system replication.

Figure 3A:
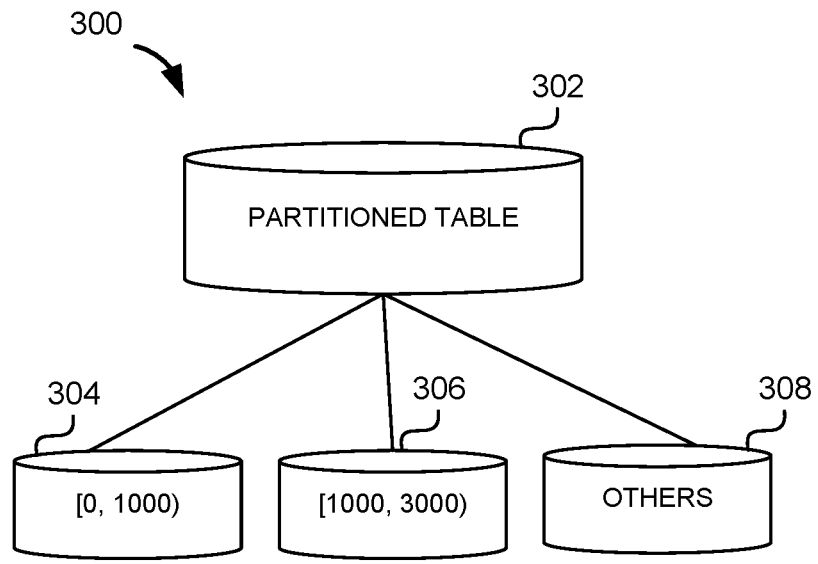
FIGS. 3A and 3B are data storage diagrams illustrating partitions associated with a partitioned table before and after adding a new partition having a dynamic range.

FIG. 3A is a data storage diagram 300 illustrating partitions associated with a partitioned table before adding a new partition having a dynamic range. As illustrated in FIG. 3A, partitioned table 302 has been created with two range-based partitions, namely existing partition 304 and existing partition 306. Existing partition 304 was initially created with the range from 0 up to (but not including) 1000. This range may correspond to various application-specific attributes. In some cases, this may correspond to an invoice number, a serial number of a particular product, or any other increasing value associated with an application that falls into the indicated range. In connection with FIG. 3A, existing partition 306 has been set up to contain rows with a key value corresponding to the range from 1000 up to 3000. Finally partition others partition 308 is used to store all other records that do not fit into existing partition 304 or existing partition 306.

Figure 3B:
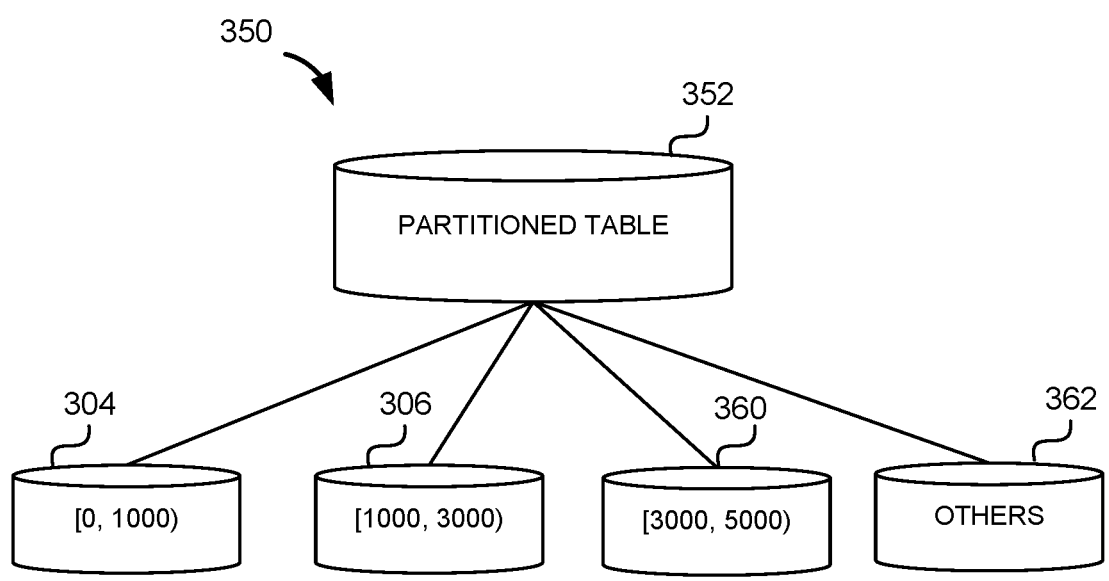

FIG. 3B is a data storage diagram 350 illustrating partitions associated with a partitioned table after adding new partition 360 having a dynamic range as specified in connection with the DDL used to create (or alter) partitioned table 352. Similar to partitioned table 302 described above in connection with FIG. 3A, partitioned table 352 has been initially created with two range-based partitions, namely existing partition 304 and existing partition 306. However, partitioned table 352 has been created (or altered) with an additional parameter in the DDL as follows.

CREATE TABLE T1 (C1 INT, C2 INT) PARTITION BY RANGE (C1) (PARTITION 0<=VALUES<1000, PARTITION 1000<=VALUES<3000, PARTITION OTHERS DYNAMIC INTERVAL 2000)

In this case, when a record having a key value that is out of range of existing partition 304 and existing partition 306, instead of storing the inserted record into partition others partition 362, before inserting the inserted record into any partition, one or more new partitions is created. In some embodiments, only the partition having the range needed to store the inserted row is created. In some other embodiments, all intervening partitions are created between the highest range-value existing partition and the new range value associated with the key value of the inserted row. For example, should the inserted row have a key value of 4500, since a dynamic interval of 2000 was specified in the corresponding DDL, a single partition, namely new partition 360 is created and the inserted row is inserted into new partition 360. In some embodiments, any rows that belong in new partition 360 will be migrated from partition others partition 362. This migration may occur in the background when, for example, the database management system is either idle or under something less than full loading of its computational capacity. If the inserted record has a key value of 6500, then an additional partition (not shown) may be created. The inserted row would then be inserted in the partition having range 5000 to 7000, and corresponding records migrated from partition others partition 362 into their respective newly created partition.

Figure 4:
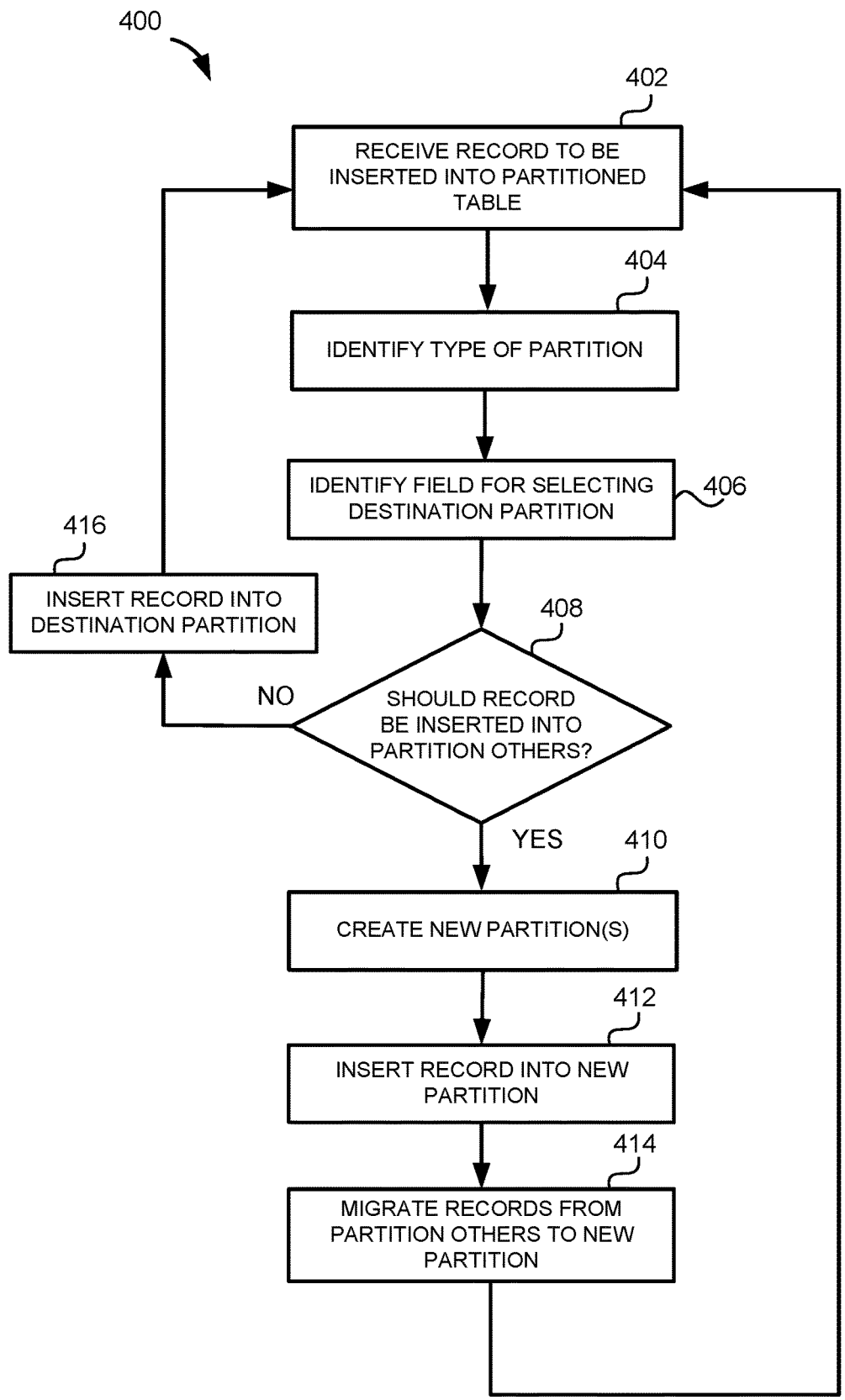
FIG. 4 is a flow diagram illustrating methods for linear interval-based dynamic range partitioning in database systems consistent with various embodiments.

FIG. 4 is a flow diagram 400 illustrating methods for linear interval-based dynamic range partitioning in database systems consistent with various embodiments. Such methods may involve mechanisms for linear interval-based dynamic range partitioning in one or more databases having one or more partitioned tables. In some embodiments, the database management systems may comprise an in-memory database system having row and column stores, such as the in-memory database management systems described in connection with FIGS. 1 and 2. At step 402, a database management system receives a request to insert a new record into a partitioned database table. Such a request may include the contents of the record to be inserted, including a range-based key value being within a range that is used to determine which partition of the partitioned table that the record to be inserted is to be inserted into. The partitioned database table may include a plurality of existing partitions and a partition others partition.

Next at step 404, it is optionally determined with which type of partition the key value is associated. In some embodiments, an internal determine-partition algorithm is provided by a database management system to address the target partition for a data insertion. This algorithm may support multi-level partitioning, where typically each level is defined on a different field within a record. For example, when inserting data into a two-level partitioned table such as HASH-RANGE, the determine-partition algorithm first determines the correct HASH node (based on the data of HASH column), which is a logical partition node. Then based on the RANGE column data value, the algorithm determines the RANGE node under the selected HASH node, which is a physical partition node who actually contains data. If no valid partition is determined, an error may be reported.

At step 406, the field for selecting a destination partition within the record to be inserted is identified. This field may be a primary key or otherwise provide a key value associated with the range specified in the various existing partitions into which the record to be inserted is to be inserted. Next at test 408, it is determined whether the new record should be inserted into the partition others partition. That is to say, based on a key value associated with the record to be inserted it is determined whether the record to be inserted should be properly be inserted into one of the existing partitions. If it is determined that the record to be inserted is not to be inserted into the partition others partition, execution proceeds to step 416, at which point, the record to be inserted is inserted into an appropriate existing partition, and execution proceeds back to step 402. On the other hand, if it is determined at test 408 that the record should be inserted into partition others execution proceeds on to step 410.

At step 410, one or more new partitions are added to or created in connection with the partitioned database table. Next, at step 412 the new record(s) are inserted into the newly added one of the one or more new partitions in the partitioned database table. In some embodiments, the plurality of existing partitions is persisted in connection with data stores connected to a single host and the one or more new partitions is persisted in connection with the single host. Finally at step 414, records from the partition others partition are migrated to one or more of the newly created partitions that were created in connection with step 410. In some embodiments, by way of a background process, a plurality of other rows contained in the partition others partition is iterated over and in response to determining that one or more of the plurality of other rows correspond to the new partition, the other rows are migrated to the one or more new partitions, by way of the background process, based on a key value associated with the one or more of the plurality of other rows.

In some embodiments, in response to determining that a configuration parameter controlling background merging of empty partitions is enabled, one or more empty partitions is identified associated with the plurality of existing partitions. Thereafter, the one or more empty partitions is merged by adjusting a range associated with at least one of the plurality of existing partitions and deleting the one or more empty partitions. In some such embodiments, the configuration parameter controlling background merging of empty partitions is disabled by default. In some embodiments, one or more ranges corresponding to the one or more new partitions is determined based on a specification of a dynamic interval that is specified when the partitioned table is created or altered.

FIG. 5 is a diagram illustrating a sample computing device architecture for implementing various aspects described herein. Computer 500 can be a desktop computer, a laptop computer, a server computer, a mobile device such as a smartphone or tablet, or any other form factor of general- or special-purpose computing device containing at least one processor. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, and network storage, such as cloud network storage. Network 516 is in turn connected to public Internet 526, which connects many networks globally. In some embodiments, computer 500 can itself be directly connected to public Internet 526.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

Having thus described various embodiments of the invention, what is claimed as new and desired to be protected by Letters Patent includes the following:

1. One or more non-transitory computer-readable media storing computer-executable instructions that, when executed by a processor, perform a method for linear interval-based dynamic range partitioning in one or more databases, the method comprising:
   receiving, by a database management system, a request to insert a new row into a partitioned database table, wherein the new row is associated with one or more fields, wherein the partitioned database table is initially created to comprise a plurality of existing table partitions and a partition others table partition, wherein different table partitions of the partitioned database table have associated ranges and store data values within the associated ranges;

identifying one or more empty partitions associated with the plurality of existing table partitions; and merging the one or more empty partitions by adjusting a range associated with at least one of the plurality of existing table partitions and deleting the one or more empty partitions, and wherein inserted rows that do not match any of the associated ranges of the existing table partitions are inserted in the partition others table partition; and based on determining that the new row should be inserted into the partition others table partition, performing a migration, by way of a background process when the database management system is idle or under less than full loading, comprising:

adding one or more new table partitions to the partitioned database table, wherein each table partition of the plurality of existing table partitions and the one or more new table partitions is defined according to the one or more fields; and inserting the new row into one of the one or more new table partitions in the partitioned database table, wherein determining that the new row should be inserted into the partition others table partition further comprises:

identifying, within the new row, a field of the one or more fields for selecting a target partition from the plurality of existing table partitions and the partition others partition; and performing a test on the field of the one or more fields that is identified, the test determining if the target partition is the partition others partition.

2. The one or more non-transitory computer-readable media of claim 1, wherein the plurality of existing table partitions is persisted in connection with data stores connected to a single host and the one or more new table partitions is persisted in connection with the single host.

3. The one or more non-transitory computer-readable media of claim 1, wherein the method further comprises:
determining that a configuration parameter controlling background merging of empty partitions is enabled.

4. The one or more non-transitory computer-readable media of claim 3, wherein the configuration parameter controlling background merging of empty partitions is disabled by default.

5. The one or more non-transitory computer-readable media of claim 1, wherein the method further comprises:
iterating over, by way of the background process, a plurality of other rows contained in the partition others table partition; and
in response to determining that one or more of the plurality of other rows correspond to the new table partition, migrating the other rows to the one or more new table partitions, by way of the background process, based on a key value associated with the one or more of the plurality of other rows.

6. The one or more non-transitory computer-readable media of claim 1, wherein one or more ranges corresponding to the one or more new table partitions is determined based on a specification of a dynamic interval that is specified when the partitioned table is created or altered.

7. A method for linear interval-based dynamic range partitioning in one or more databases, the method comprising:

receiving, by a database management system, a record to be inserted into a partitioned database table, wherein the record to be inserted is associated with one or more fields, wherein the partitioned database table is created to initially comprise a plurality of existing table partitions and a partition others table partition, wherein different table partitions of the partitioned database table have associated ranges and store data values within the associated ranges;

identifying one or more empty partitions associated with the plurality of existing table partitions; and merging the one or more empty partitions by adjusting a range associated with at least one of the plurality of existing table partitions and deleting the one or more empty partitions, and wherein inserted records that do not match any of the associated ranges of the existing table partitions are inserted in the partition others table partition; and based on determining that the record has a key value outside ranges associated with the plurality of existing table partitions, performing a migration, by way of a background process when the database management system is idle or under less than full loading, comprising:
adding one or more new table partitions to the partitioned database table, wherein each table partition of the plurality of existing table partitions and the one or more new table partitions is defined according to the one or more fields; and inserting the record to be inserted into one of the one or more new table partitions in the partitioned database table, wherein one or more ranges corresponding to the one or more new table partitions is determined based on a specification of a dynamic interval that is specified when the partitioned table is created or altered, wherein determining the record to be inserted into the partition others table partition further comprises: identifying, within the new row, a field of the one or more fields for selecting a target partition from the plurality of existing table partitions and the partition others partition; and performing a test on the field of the one or more fields that is identified, the test determining if the target partition is the partition others partition.

8. The method of claim 7, wherein the plurality of existing table partitions is persisted in connection with data stores connected to a single host and the one or more new table partitions is persisted in connection with the single host.

9. The method of claim 7, further comprising:
determining that a configuration parameter controlling background merging of empty partitions is enabled.

10. The method of claim 9, wherein the configuration parameter controlling background merging of empty partitions is disabled by default.

11. The method of claim 7, further comprising:
iterating over, by way of the background process, a plurality of other rows contained in the partition others table partition; and
in response to determining that one or more of the plurality of other rows correspond to the new table partition, migrating the other rows to the one or more new table partitions, by way of the background process, based on a key value associated with the one or more of the plurality of other rows.

12. The method of claim 7, wherein one or more ranges corresponding to the one or more new table partitions is determined based on a specification of a dynamic interval that is specified when the partitioned table is created or altered.

13. A system for linear interval-based dynamic range partitioning in one or more databases, the system comprising: at least one processor; and at least one non-transitory memory storing computer executable instructions that when executed by the at least one processor cause the system to carry out actions comprising:

receiving, by a database management system, a request to insert a new record into a range partitioned database table, wherein the new record is associated with one or more fields, wherein the range partitioned database table is initially created to comprise a plurality of existing table partitions having existing ranges and a partition others table partition, wherein different table partitions of the range partitioned database table store data values within the existing ranges;

identifying one or more empty partitions associated with the plurality of existing table partitions; and merging the one or more empty partitions by adjusting a range associated with at least one of the plurality of existing table partitions and deleting the one or more empty partitions, and wherein inserted records that do not match any of the existing ranges of the existing table partitions are inserted in the partition others table partition; and based on determining that the new record has a key that is outside the existing ranges of the plurality of existing table partitions, performing a migration, by way of a background process when the database management system is idle or under less than full loading, comprising: adding one or more new table partitions to the range partitioned database table, wherein each table partition of the plurality of existing table partitions and the one or more new table partitions is defined according to the one or more fields; and inserting the new record into one of the one or more new table partitions in the range partitioned database table wherein determining the record to be inserted into the partition others table partition further comprises: identifying, within the new row, a field of the one or more fields for selecting a target partition from the plurality of existing table partitions and the partition others partition; and performing a test on the field of the one or more fields that is identified, the test determining if the target partition is the partition others partition.

14. The system of claim 13, wherein the plurality of existing table partitions is persisted in connection with data stores connected to a single host and the one or more new table partitions is persisted in connection with the single host.

15. The system of claim 13, wherein the actions further comprise:

determining that a configuration parameter controlling background merging of empty partitions is enabled.

16. The system of claim 15, wherein the configuration parameter controlling background merging of empty partitions is disabled by default.

17. The system of claim 13, wherein the actions further comprise:

iterating over, by way of a background process, a plurality of other rows contained in the partition others partition; and in response to determining that one or more of the plurality of other rows correspond to the new partition, migrating the other rows to the one or more new partitions, by way of the background process, based on a key value associated with the one or more of the plurality of other rows.

18. The one or more non-transitory computer-readable media of claim 3, said merging the one or more empty partitions by adjusting the range associated with at least one of the plurality of existing table partitions and deleting the one or more empty partitions comprises merging the one or more empty partitions by executing a data definition language CREATE TABLE statement specifying a plurality of ranges of column values, wherein the plurality of ranges of column values in the CREATE TABLE statement comprise one or more combinations of the one or more empty partitions identified as associated with the plurality of existing table partitions and one or more of the plurality of existing table partitions.

* * * * *